(12) United States Patent
Otsubo

(10) Patent No.: US 8,260,510 B2
(45) Date of Patent: Sep. 4, 2012

(54) CONTROL APPARATUS AND CONTROL METHOD FOR TRANSMISSION

(75) Inventor: Masaaki Otsubo, Nishikamo-gun (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 585 days.

(21) Appl. No.: 12/520,245

(22) PCT Filed: Dec. 19, 2007

(86) PCT No.: PCT/IB2007/004275
§ 371 (c)(1), (2), (4) Date: Jun. 19, 2009

(87) PCT Pub. No.: WO2008/078188
PCT Pub. Date: Jul. 3, 2008

(65) Prior Publication Data
US 2010/0049412 A1    Feb. 25, 2010

(30) Foreign Application Priority Data
Dec. 20, 2006    (JP) .................................. 2006-342937

(51) Int. Cl.
*G06F 7/00*    (2006.01)

(52) U.S. Cl. ........................................................ 701/51
(58) Field of Classification Search .............. 701/51–52, 701/59, 64, 67, 70, 78–79, 95
See application file for complete search history.

(56) References Cited

U.S. PATENT DOCUMENTS

| 6,189,665 | B1 * | 2/2001 | Yamamoto et al. .......... 192/3.58 |
| 6,679,810 | B1 | 1/2004 | Boll et al. |
| 2005/0064988 | A1 * | 3/2005 | Hasegawa et al. .............. 477/70 |

FOREIGN PATENT DOCUMENTS

| EP | 0 997 659 A1 | 5/2000 |
| FR | 2 818 204 A1 | 6/2002 |
| JP | 2000-130476 A | 5/2000 |

* cited by examiner

*Primary Examiner* — Kim T Nguyen
(74) *Attorney, Agent, or Firm* — Sughrue Mion, PLLC

(57) ABSTRACT

When there is a shift command for the transmission (3) during or immediately after clutch touch point learning, a shift operation value for the transmission (3) is reduced compared to what it normally is (steps ST11 and ST12). Reducing the shift operation value in this way enables the change in the rotation speed of an input rotating body at the time of a gear shift operation to be gradual if that gear shift operation is during or immediately after clutch touch point learning. As a result, inertia torque, and thus shift shock, can be suppressed.

16 Claims, 7 Drawing Sheets

CONTROL APPARATUS AND CONTROL METHOD FOR TRANSMISSION

BACKGROUND OF THE INVENTION

1. Field of the Invention

The invention relates to a control apparatus and control method for a transmission mounted in a vehicle. More particularly, the invention relates to a control apparatus and control method for a transmission that is connected to a driving power source via an automatic clutch.

2. Description of the Related Art

In a vehicle provided with a driving power source such as an engine (e.g., an internal combustion engine), an automatic transmission that automatically sets the optimum speed ratio between the engine and driving wheels is known as a transmission that appropriately transmits torque and rotation speed generated by the engine to the driving wheels according to the running state of the vehicle.

The automatic transmission mounted in the vehicle may be, for example, a planetary gear type transmission that sets the gear speed using clutches, brakes and a planetary gear set(s), or a belt type CVT (CVT: Continuously Variable Transmission) that adjusts the speed ratio smoothly (continuously) instead of in steps.

Also, another kind of transmission mounted in a vehicle is an automated manual transmission (AMT) that automatically performs a shift operation (i.e., changes the gear speed) using a shift actuator and a select actuator. An automatic clutch is used to connect this kind of automated manual transmission to a driving power source such as an engine.

The automatic clutch includes a friction type clutch and a clutch operating apparatus to operate the clutch. The clutch operating apparatus includes, for example, a hydraulic actuator for operating a release fork, and a hydraulic circuit for engaging and disengaging the clutch by controlling the hydraulic pressure of this actuator.

In the hydraulic circuit is provided an electromagnetic valve that is electrically operated, such as a solenoid valve that actuates a valve body by running current to an exciting coil. The release fork is operated by driving the actuator, which is done by controlling (i.e., selectively allowing or preventing) the flow of current to the exciting coil of the solenoid valve.

In the automatic clutch that is used with an automated manual transmission or the like, the clutch touch point (i.e., the point at which the clutch engages) changes depending on the friction and deformation and the like of the clutch so the clutch touch point must be learned in order to have the clutch always engage at the appropriate timing.

One example of clutch touch point learning (also referred to as "clutch neutral learning") will be described. First, the clutch is automatically fully disengaged when a predetermined learning condition is satisfied, e.g., when the transmission is in neutral while the vehicle is stopped (idling). Next, at the point the output side of the clutch (i.e., the input side of the transmission) stops rotating, the clutch starts to be gradually automatically engaged. Then when the output side of the clutch reaches a predetermined rotation speed (such as 200 to 300 rpm), the clutch stroke (half clutch position) at this time is learned as the clutch touch point (see Japanese Patent Application Publication No. JP-A-2000-130476, for example).

Incidentally, with an automated manual transmission (AMT), it is desirable to update the learning value of the clutch touch point of the automatic clutch when the vehicle is stopped (i.e., idling) and the transmission is in neutral.

However, during or immediately after clutch touch point learning, the rotating body on the output side of the automatic clutch, i.e., the input rotating body that includes the input shaft and the input side gear set of the transmission, is rotating (at 200 to 300 rpm, for example). Therefore, if a gear shift is performed during or immediately after clutch touch point learning, a phenomenon will occur in which the rotation speed of the input rotating body is reduced by the transfer of energy between the input rotating body (in a rotating state) and the output rotating body (in a static state). As a result, inertia torque is generated when the rotation speed of that input rotating body is reduced, which may cause an unpleasant sensation for the driver.

SUMMARY OF THE INVENTION

This invention provides a control apparatus and control method for a transmission that inhibits an unpleasant sensation caused by inertia torque even when a gear shift is performed during or immediately after clutch touch point learning of an automatic clutch.

A first aspect of the invention relates to a control apparatus for a transmission that includes shift operation executing means for performing a shift operation in the transmission of a vehicle, clutch operating means for selectively engaging and disengaging a clutch that is arranged between a driving power source of the vehicle and the transmission, and learning means for learning a clutch touch point of the clutch. This control apparatus includes determining means for determining whether clutch touch point learning is being, or has just been, performed by the learning means, and shift operation value reducing means for reducing a shift operation value in the transmission when there is a shift command for the transmission during or immediately after the clutch touch point learning.

According to this structure, when there is a shift command for the transmission during or immediately after clutch touch point learning, a shift operation value for the transmission is reduced compared to what it normally is (e.g., the gear shifting speed is reduced compared to what it is normally). Accordingly, even if a gear shift is performed during or immediately after clutch touch point learning, the change in the rotation speed of an input rotating body (i.e., a rotating body on the output side of the clutch) at that time can be gradual. As a result, inertia torque can be suppressed.

In the foregoing aspect, the control apparatus may also include accelerator operation determining means for determining whether an accelerator operation is being performed, and brake operation determining means for determining whether a brake operation is being performed. Also, the shift operation value reducing means may reduce the shift operation value more when at least one of two conditions is satisfied during or immediately after the clutch touch point learning, the two conditions being i) that an accelerator be off, and ii) that a brake be on.

According to this structure, the shift operation value is reduced more (e.g., the gear shifting speed is substantially reduced compared to the normal gear shifting speed) when at least one of the two conditions, one being that the accelerator be off and the other being that the brake be on, is satisfied, i.e., when it is determined that the driver does not intend to take off from a standstill shortly, during or immediately after the clutch touch point learning. As a result, the inertia torque that is generated when a gear shift operation is performed can be even more effectively suppressed.

In the foregoing structure, the control apparatus may also include shift operation detecting means for detecting a shift operation in the transmission. Also, the shift operation value reducing means may determine that there is a shift command when the shift operation detecting means detects a shift operation.

In the foregoing structure, the shift operation value reducing means may reduce a value of at least one of i) a shifting speed, ii) a load applied at the time of the shift operation, and iii) pressure applied at the time of the shift operation. Specific examples of methods for reducing the shift operation value include reducing a gear shifting speed so that it is slower than normal, and reducing a load (i.e., force) applied in the gear shifting direction during a gear shift so that the load (i.e., force) is less than it normally is. Also, when the actuator used to perform the shift operation is a hydraulic actuator, another method that may be used involves reducing the pressure of hydraulic fluid supplied to that actuator (i.e., reducing the hydraulic pressure) so that it is less than it normally is.

In the foregoing structure, the control apparatus may also include clutch touch point learning cancelling means for cancelling the clutch touch point learning when there is a shift command for the transmission while the learning means is learning the clutch touch point.

A second aspect of the invention relates to a control method for a transmission that includes shift operation executing means for performing a shift operation in the transmission of a vehicle, clutch operating means for selectively engaging and disengaging a clutch that is arranged between a driving power source of the vehicle and the transmission, and learning means for learning a clutch touch point of the clutch. This control method includes determining whether clutch touch point learning is being performed, or has just been performed, by the learning means, and reducing a shift operation value in the transmission when there is a shift command for the transmission during or immediately after the clutch touch point learning.

According to the control apparatus and control method for a transmission of the invention, a shift operation value for the transmission is reduced when there is a shift command during or immediately after clutch touch point learning. As a result, even if a gear shift operation is performed during or immediately after clutch touch point learning, an unpleasant sensation caused by inertia torque can be suppressed.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 5 is a block diagram of the structure of a control system of an ECU and the like;

DETAILED DESCRIPTION OF THE EMBODIMENTS

In the following description and the accompanying drawings, the present invention will be described in more detail in terms of example embodiments.

A powertrain of a vehicle that includes a control apparatus for a transmission according to one example embodiment of the invention will be described with reference to FIG. 1. The control apparatus in this example embodiment is realized by a program that is executed by an ECU 100 shown in FIG. 1.

Figure 1:
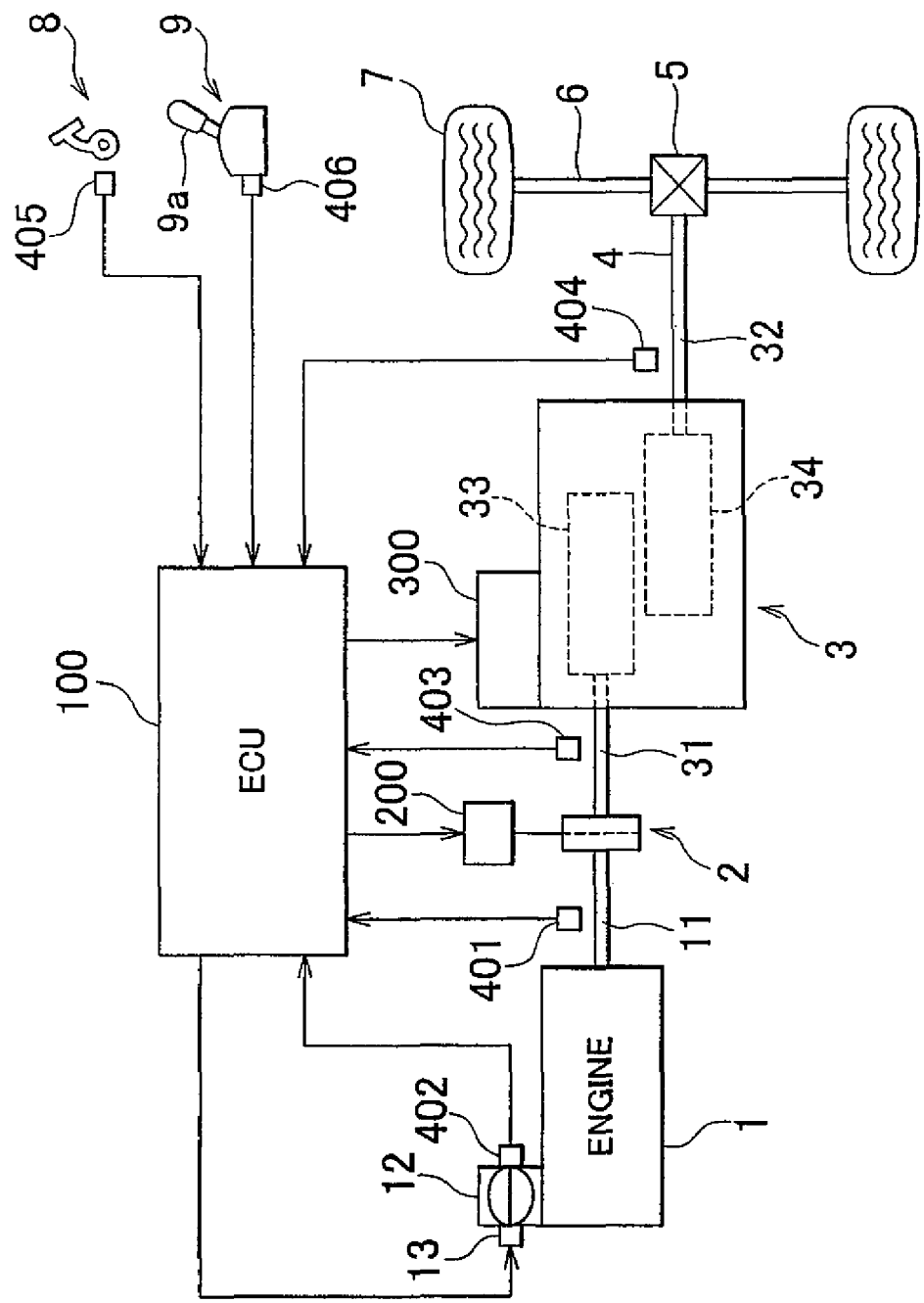
FIG. 1 is a block diagram schematically showing a control apparatus of a transmission according to one example embodiment of the invention.

As shown in FIG. 1, the powertrain of this vehicle includes an engine 1, an automatic clutch 2, a transmission 3, and the ECU 100, each of which will hereinafter be described.

—Engine—

A crankshaft 11 which is an output shaft of the engine 1 is connected to a flywheel 21 (FIG. 2) of the automatic clutch 2. The rotation speed of the crankshaft 11 (i.e., the engine speed Ne) is detected by an engine speed sensor 401.

The amount of intake air drawn into the engine 1 is adjusted by an electronically controlled throttle valve 12. This throttle valve 12 can electronically control the throttle opening amount, which is detected by a throttle opening amount sensor 402, independently from an accelerator pedal operation by a driver.

The opening amount of the throttle valve 12 is controlled by the ECU 100. More specifically, the ECU 100 controls the opening amount of the throttle valve 12 so as to obtain the optimum intake air amount (target intake air amount) for the operating state of the engine, e.g., the engine speed Ne detected by the engine speed sensor 401 and the accelerator pedal depression amount (hereinafter simply referred to as the "accelerator depression amount") by the driver. More specifically, the actual opening amount of the throttle valve 12 is detected using the throttle opening amount sensor 402, and a throttle motor 13 of the throttle valve 12 is feedback controlled so that the actual throttle opening amount comes to match the throttle opening amount at which the target intake air amount can be obtained (i.e., comes to match the target throttle opening amount).

—Automatic Clutch and Transmission—

Next, the specific structure of the automatic clutch 2 will be described with reference to FIG. 2.

The automatic clutch 2 in this example embodiment includes a dry-operating single disc friction clutch 20 (hereinafter simply referred to as "clutch 20") and a clutch operating apparatus 200.

The clutch 20 includes a flywheel 21, a clutch disc 22, a pressure plate 23, a diaphragm spring 24, and a clutch cover 25 and the like.

The flywheel 21 is attached to the crankshaft 11. The clutch cover 25 is attached to the flywheel 21 so that it can rotate together with the flywheel 21. The clutch disc 22 is fixed by spline engagement to an input shaft 31 of the transmission 3 (FIG. 1). The clutch disc 22 is arranged facing the flywheel 21.

The pressure plate 23 is arranged between the clutch disc 22 and the clutch cover 25. The pressure plate 23 is pressed toward the flywheel 21 side by the outer peripheral portion of the diaphragm spring 24. As a result, frictional force is produced between the clutch disc 22 and the pressure plate 23 as well as between the flywheel 21 and the clutch disc 22. It is this frictional force that causes the clutch 20 to engage such that the flywheel 21, the clutch disc 22, and the pressure plate 23, all rotate together.

When the clutch 20 is engaged in this manner, power is transmitted from the engine 1 to the transmission 3. The torque that is transmitted with that power from the engine 1 to the transmission 3 will be referred to as clutch torque. This clutch torque is substantially 0 when the clutch 20 is disengaged and increases as the clutch disc 22 slips less and less as the clutch 20 gradually becomes engaged, and then finally comes to match the rotational torque of the crankshaft 11 when the clutch 20 is fully engaged.

The clutch operating apparatus 200 includes a release bearing 201, a release fork 202, a hydraulic clutch actuator 203, and a hydraulic circuit 204 and the like. This clutch operating apparatus 200 displaces the pressure plate 23 of the clutch 20 in the axial direction, either toward the clutch disc 22 so as to tightly squeeze the clutch disc 22 between it and the flywheel 21 or away from the clutch disc 22 so as to release the clutch disc 22.

The release bearing 201 fits onto the input shaft 31 of the transmission 3 in such a manner that it can be displaced in the axial direction, and abuts with a center portion of the diaphragm spring 24.

The release fork 202 is a member that moves the release bearing 201 toward the flywheel 21 side. The clutch actuator 203 has a cylinder 203a and a piston rod 203b, and moves the piston rod 203b forward or backward using hydraulic pressure such that the release fork 202 rotates about a fulcrum 202a.

The hydraulic circuit 204 is a circuit that controls the hydraulic pressure of hydraulic fluid supplied to the clutch actuator 203. This hydraulic circuit 204 includes, for example, a solenoid valve that actuates a valve body by running current to an exciting coil. The piston rod 203b is moved forward or backward by allowing or preventing the flow of current to the exciting coil of the solenoid valve.

A solenoid control signal (hydraulic pressure command value) is sent from the ECU 100 to the clutch operating apparatus 200 (i.e., the hydraulic circuit 204) of the automatic clutch 2 described above, and the clutch actuator 203 is controlled (i.e., driven) based on that solenoid control signal.

Figure 2:
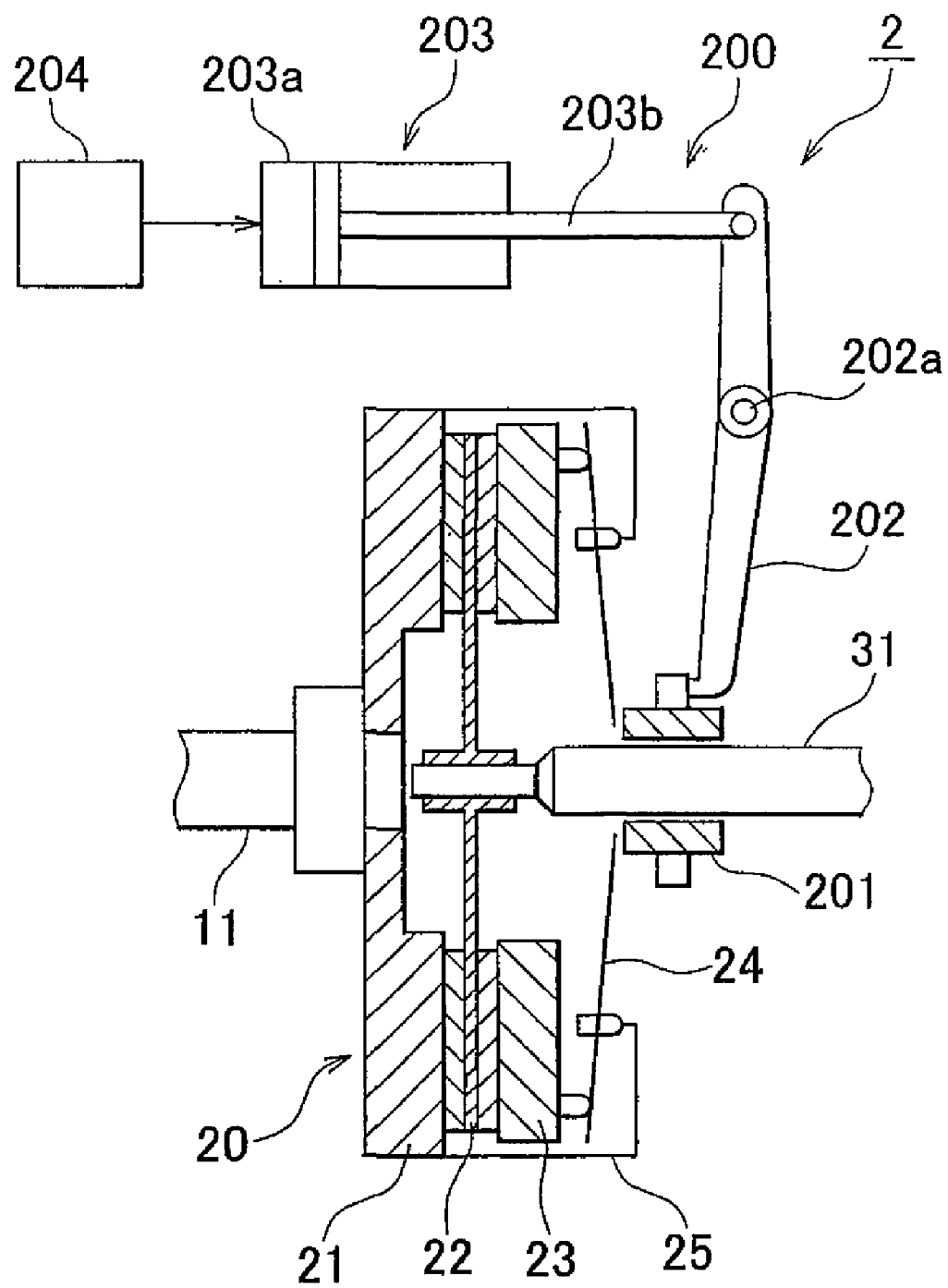
FIG. 2 is a sectional view showing a frame format of the structure of an automatic clutch used in the transmission shown in FIG. 1.

More specifically, when the clutch actuator 203 is driven and the piston rod 203b moves forward (i.e., toward the right in FIG. 2) from the state shown in FIG. 2 (i.e., a clutch engaged state), the release fork 202 rotates about the fulcrum 202a (i.e., rotates in the clockwise direction in FIG. 2), which causes the release bearing 201 to move toward the flywheel 21 side. When the release bearing 201 moves in this way, the center portion of the diaphragm spring 24, i.e., the portion of the diaphragm spring 24 against which the release bearing 201 abuts, moves toward the flywheel 21 side (i.e., the diaphragm spring 24 becomes inverted). Accordingly, the pressing force of the pressure plate 23 from the diaphragm spring 24 decreases so frictional force is reduced, and as a result, the clutch 20 becomes disengaged.

On the other hand, when the piston rod 203b of the clutch actuator 203 moves backward (i.e., toward the left in FIG. 2) from the clutch disengaged state, the elastic force of the diaphragm spring 24 causes the pressure plate 23 to press toward the flywheel 21 side. This results in frictional force being produced between the clutch disc 22 and the pressure plate 23 as well as between the flywheel 21 and the clutch disc 22. It is this frictional force that causes the clutch 20 to engage.

The transmission 3 is configured like a typical manual transmission such as a parallel gear transmission with five forward gear speeds and one reverse gear speed, for example. The input shaft 31 of the transmission 3 is connected to the clutch disc 22 of the clutch 20 described above (see FIG. 2). Also, as shown in FIG. 1, the rotation of the output shaft 32 of the transmission 3 is transmitted to driving wheels 7 via a drive shaft 4, differential gears 5, and axles 6 and the like.

The rotation speed of the input shaft of the transmission is detected by the input shaft rotation speed sensor 403 (FIG. 1). Also, the rotation speed of the output shaft 32 of the transmission 3 is detected by an output shaft rotation speed sensor 404 (FIG. 1). The current gear speed can be determined based on the ratio of the rotation speeds obtained from output signals from the input shaft rotation speed sensor 403 and the output shaft rotation speed sensor 404 (i.e. based on the ratio of the output rotation speed/input rotation speed).

The transmission 3 in this example embodiment is an automated manual transmission (AMT) which is provided with a shift operation executing apparatus 300 having a shift fork and a select-and-shift shaft, and which on the whole performs gear shift operations automatically.

Figure 3:
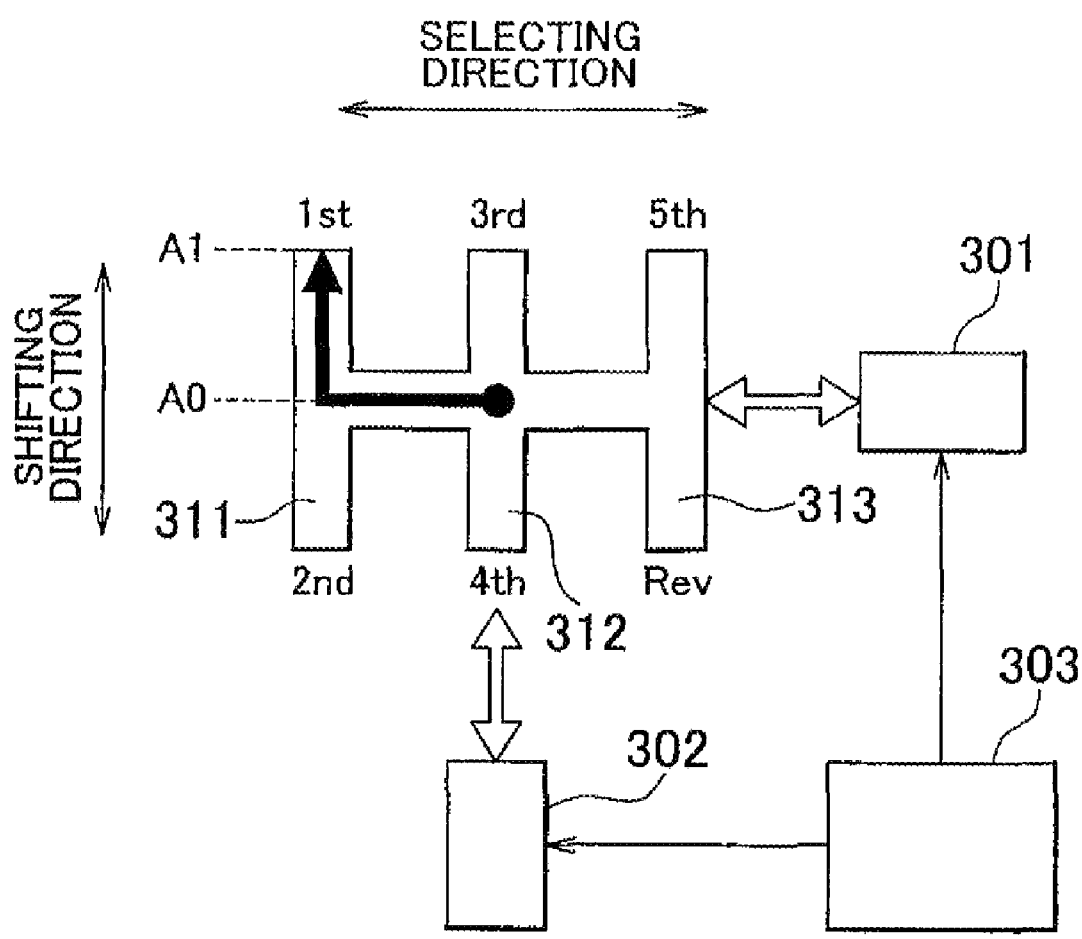
FIG. 3 is a view showing a frame format of a gate mechanism and actuator and the like of a shift operation executing apparatus shown in FIG. 1.

As shown in FIG. 3, the shift operation executing apparatus 300 includes a hydraulic select actuator 301 that performs an operation in the selecting direction (i.e., a selecting operation), a hydraulic shift actuator 302 that performs an operation in the shifting direction (i.e., a shifting operation), and a hydraulic circuit 303 that controls the hydraulic pressure of hydraulic fluid supplied to these actuators 301 and 302, and the like.

In the shift operation executing apparatus 300, a plurality of gates having shift positions that specify the gear speed are arranged in the selecting direction. More specifically, as shown in FIG. 3, a first gate 311 that specifies first speed (1st) and second speed (2nd), a second gate 312 that specifies third speed (3rd) and fourth speed (4th), and a third gate 313 that specifies fifth speed (5th) and reverse (Rev) are arranged in the selecting direction.

The gear speed can be changed (e.g., neutral (N)→first speed (1st)) by driving the shift actuator 302 while one (e.g., the first gate 311) of these gates, i.e., the first gate 311 to the third gate 313, is selected by driving the select actuator 301.

The hydraulic circuit 303 includes a solenoid valve that actuates a valve body by running current to an exciting coil. Hydraulic pressure is selectively supplied to or released from both the select actuator 301 and the shift actuator 302 by allowing or preventing the flow of current to the exciting coil of the solenoid valve.

Then the ECU 100 sends a solenoid control signal (i.e., a hydraulic pressure command value) to the hydraulic circuit 303 of the shift operation executing apparatus 300 described above, and the select actuator 301 and the shift actuator 302 are each individually controlled based on that solenoid control signal such that a selecting operation and a shifting operation of the transmission 3 are executed automatically.

Here, the gear shifting speed during the shifting operation (i.e., the speed in the shifting direction shown in FIG. 3) is variable and in this example embodiment can be selectively set at a speed such as "normal", "reduced", or "substantially reduced". The gear shifting speeds "reduced" and "substantially reduced" will be described later.

Figure 4:
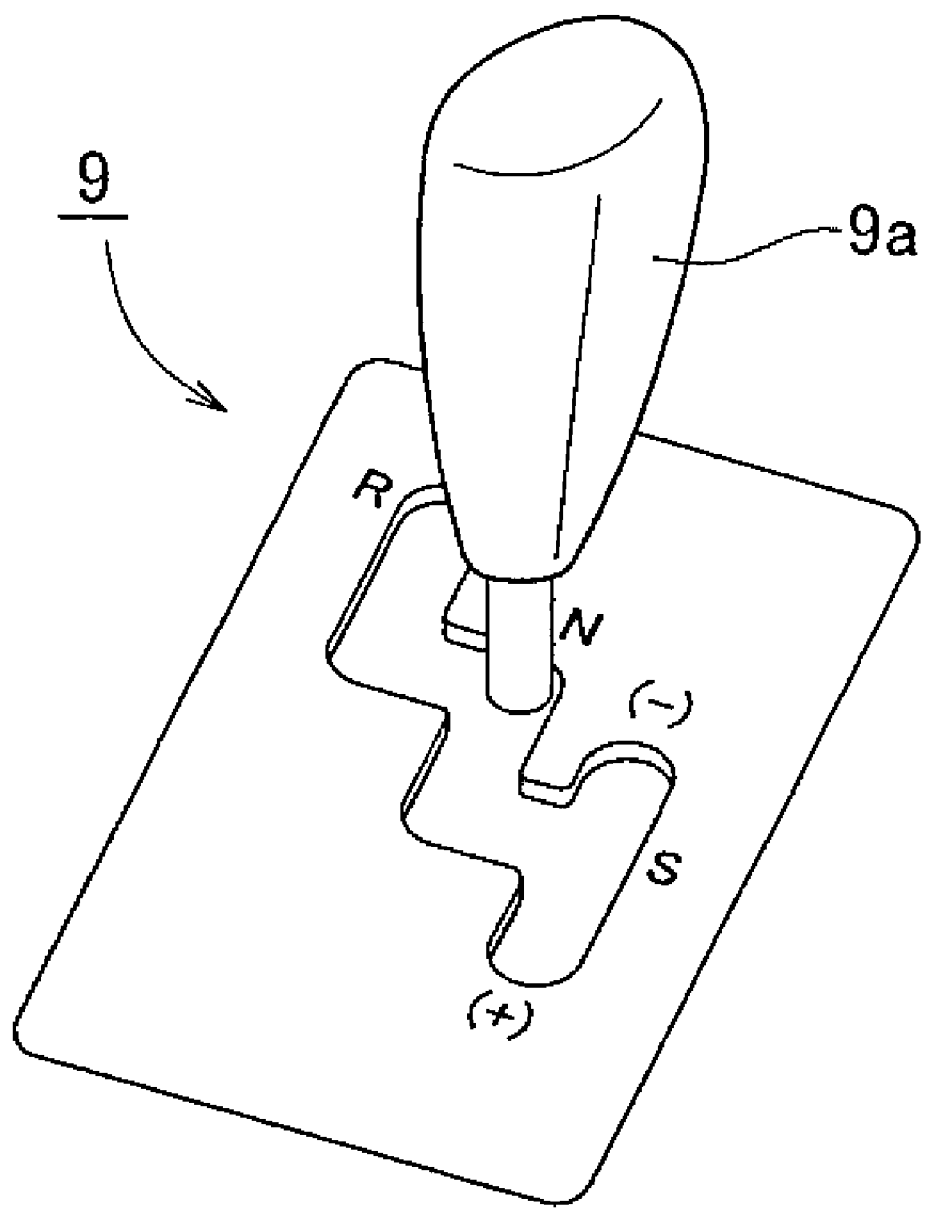
FIG. 4 is a perspective view of the structure of a shift lever portion of a shift device.

Meanwhile, a shift device 9 is arranged near the driver's seat in the vehicle. As shown in FIG. 4, this shift device 9 includes a shift lever 9a that is displaceably provided, as well as a reverse (R) position, a neutral (N) position, and a sequential (S) position. The driver is able to displace (i.e., shift) the shift lever 9a into any one of these positions as desired. The position, from among the reverse (R) position, the neutral (N) position, and the sequential (S) position (also including a "+"

position and a "−" position which will be described later), of the shift lever 9a is detected by a shift position sensor 406 (see FIG. 1).

The operating mode of the transmission 3 when each of these shift positions is selected will hereinafter be described for each shift position (i.e., the N position, the R position, and the S position).

The N position is a position that is selected to disconnect the input shaft 31 from the output shaft 32 of the transmission 3. When the shift lever 9a is placed in the N position, the gears of the input side gear set 33 and the output side gear set 34 of the transmission 3 are not in mesh so the transmission of power along the shifting gear trains is interrupted.

The R position is a position that is selected to drive the vehicle in reverse. When the shift lever 9a is placed in the R position, the transmission 3 shifts into reverse.

The S position is a position that is selected when the driver wishes to manually perform a shifting operation using any of the plurality of forward gear speeds (i.e., the five forward gear speeds). Plus (+) and minus (−) positions are provided in front and in back of this S position. The "+" position is a position into which the driver shifts the shift lever 9a when he/she wishes to upshift, and the "−" position is a position into which the driver shifts the shift lever 9a when he/she wishes to downshift.

When the shift lever 9a is in the S position and is then pulled backward into the "+" position or pushed forward into the "−" position, the transmission 3 upshifts or downshifts through the forward gear speeds. More specifically, each time the shift lever 9a is pulled into the "+" position, the gear speed increases by one (e.g., 1st→2nd→ . . . →5th). On the other hand, each time the shift lever 9a is pushed into the "−" position, the gear speed decreases by one (e.g., 5th→4th . . . →1st).

Incidentally, when an upshift paddle switch (i.e., an operating switch for shifting into the "+" position) and a downshift paddle switch (i.e., an operating switch for shifting into the "−" position) are provided on the steering wheel or steering column or the like, in addition to the shift lever 9a described above, and the shift lever 9a is in the S position, the structure may be such that the gear speed increases by one each time the upshift paddle switch is operated once and decreases by one each time the downshift paddle switch is operated once.

—ECU—

Figure 5:
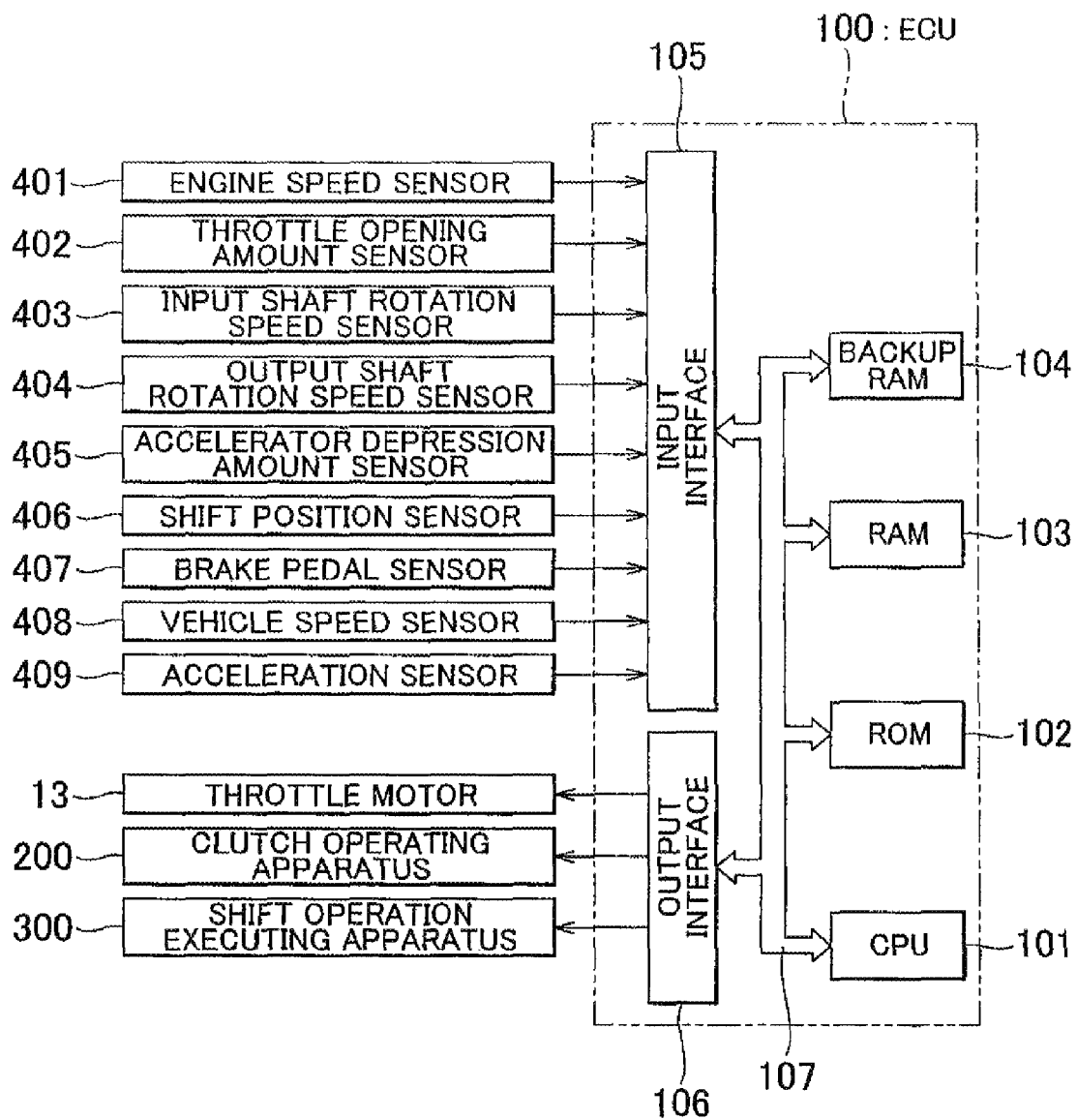

The ECU 100 includes a CPU 101, ROM 102, RAM 103, and backup RAM 104 and the like, as shown in FIG. 5.

The ROM 102 stores various control programs, as well as maps and the like that are referenced when executing those various control programs. The CPU 101 executes computing and processing based on the various control programs and maps stored in the ROM 102. The RAM 103 is memory that temporarily stores the results of the computations performed by the CPU 101, as well as data and the like that has been input from various sensors. The backup RAM 104 is nonvolatile memory that stores data and the like to be saved when the engine 1 is stopped.

The CPU 101, ROM 102, RAM 103, and backup RAM 104 are all connected together, as well as connected to an input interface 105 and an output interface 106, via a bus 107.

Various sensors and the like are connected to the input interface 105 of the ECU 100. Some of these sensors include the engine speed sensor 401, the throttle opening amount sensor 402, the input shaft rotation speed sensor 403, the output shaft rotation speed sensor 404, an accelerator depression amount sensor 405 that detects the depression amount of an accelerator pedal 8, the shift position sensor 406 that detects the shift position of the shift device 9, a brake pedal sensor 407, a vehicle speed sensor 408 that detects the speed of the vehicle, and an acceleration sensor 409 that detects acceleration of the vehicle. Signals from these various sensors are input to the ECU 100.

Various devices and the like are connected to the output interface 106 of the ECU 100. Some of these devices include the throttle motor 13 that opens and closes the throttle valve 12, the clutch operating apparatus 200 of the automatic clutch 2, and the shift operation executing apparatus 300 of the transmission 3.

The ECU 100 executes various control of the engine 1, including opening amount control of the throttle valve 12 of the engine 1, based on the output signals from the various sensors described above. The ECU 100 also engages and disengages the clutch 20 by sending a control signal to the clutch operating apparatus 200 of the automatic clutch 2 at times such as when a shift operation is to be performed in the transmission 3. Further, the ECU 100 performs shift control to change gear speeds in the transmission 3 by sending a control signal (i.e., a hydraulic pressure command value) to the shift operation executing apparatus 300 of the transmission 3 based on the output signals from the various sensors described above.

The ECU 100 then executes idle speed control, clutch touch point learning, and gear shifting speed control, each of which will hereinafter be described.

First, idle speed control will be described.

Idle speed control is control that is executed when the engine 1 is idling. The amount of intake air drawn into the engine 1 is feedback controlled by adjusting the opening amount of the throttle valve 12 so that the actual idle speed during idling comes to match a target idle speed. More specifically, the target idle speed is calculated referencing a map or the like based on the operating state of the engine 1. Then the actual idle speed (i.e., the engine speed) is read from an output signal from the engine speed sensor 401 and the amount of intake air that is drawn into the engine 1 is feedback controlled by adjusting the opening amount of the throttle valve 12 so that actual idle speed comes to match the target idle speed.

Next, clutch touch point learning will be described.

The ECU 100 drives the clutch operating apparatus 200 of the automatic clutch 2 to completely disengage the clutch 20 when a predetermined learning condition, such as the condition that the vehicle be stopped (i.e., idling) and the transmission be in neutral, is satisfied. Then the ECU 100 waits until the output side of the clutch 20 (i.e., the input shaft 31 of the transmission 3) has stopped rotating, and when it has, the ECU 100 starts to gradually engage the clutch 20 by driving the clutch operating apparatus 200. When the rotation speed of the output side of the clutch 20, i.e., the rotation speed obtained from an output signal from the input shaft rotation speed sensor 403, reaches a predetermined rotation speed (such as 200 to 300 rpm), the ECU 100 learns the clutch stroke (i.e., half clutch position) at that time as the clutch touch point.

Incidentally, in the clutch touch point learning in this example embodiment, the clutch 20 starts to actually engage at a rotation speed of 200 to 300 rpm, for example, but the rotation speed at engagement is not limited to this. That is, an appropriate value may be set taking into account the resolution performance of the input shaft rotation speed sensor 403 and the like.

In an automated manual transmission (AMT) such as that described above, it is desirable to update the learning value of the clutch touch point of the automatic clutch 2 when the vehicle is stopped (i.e., idling) and the transmission 3 is in neutral (N).

However, during or immediately after clutch touch point learning, the rotating body on the output side of the automatic clutch 2, i.e., the input rotating body including the input shaft 31 and the input side gear set 33 of the transmission 3, are rotating (at approximately 200 to 300 rpm, for example). Therefore, if a gear shift operation is performed at that time, a phenomenon will occur in which the rotation speed of the input rotating body is reduced by the transfer of energy between the input rotating body (rotating state) and the output rotating body (static state). As a result, inertia torque is generated when the rotation speed of that input rotating body is reduced, which may cause an unpleasant sensation for the driver.

Taking this into account, in this example embodiment the inertial torque is suppressed by reducing the gear shifting speed of the transmission 3 while the clutch touch point is being learned or immediately thereafter.

Figure 6:
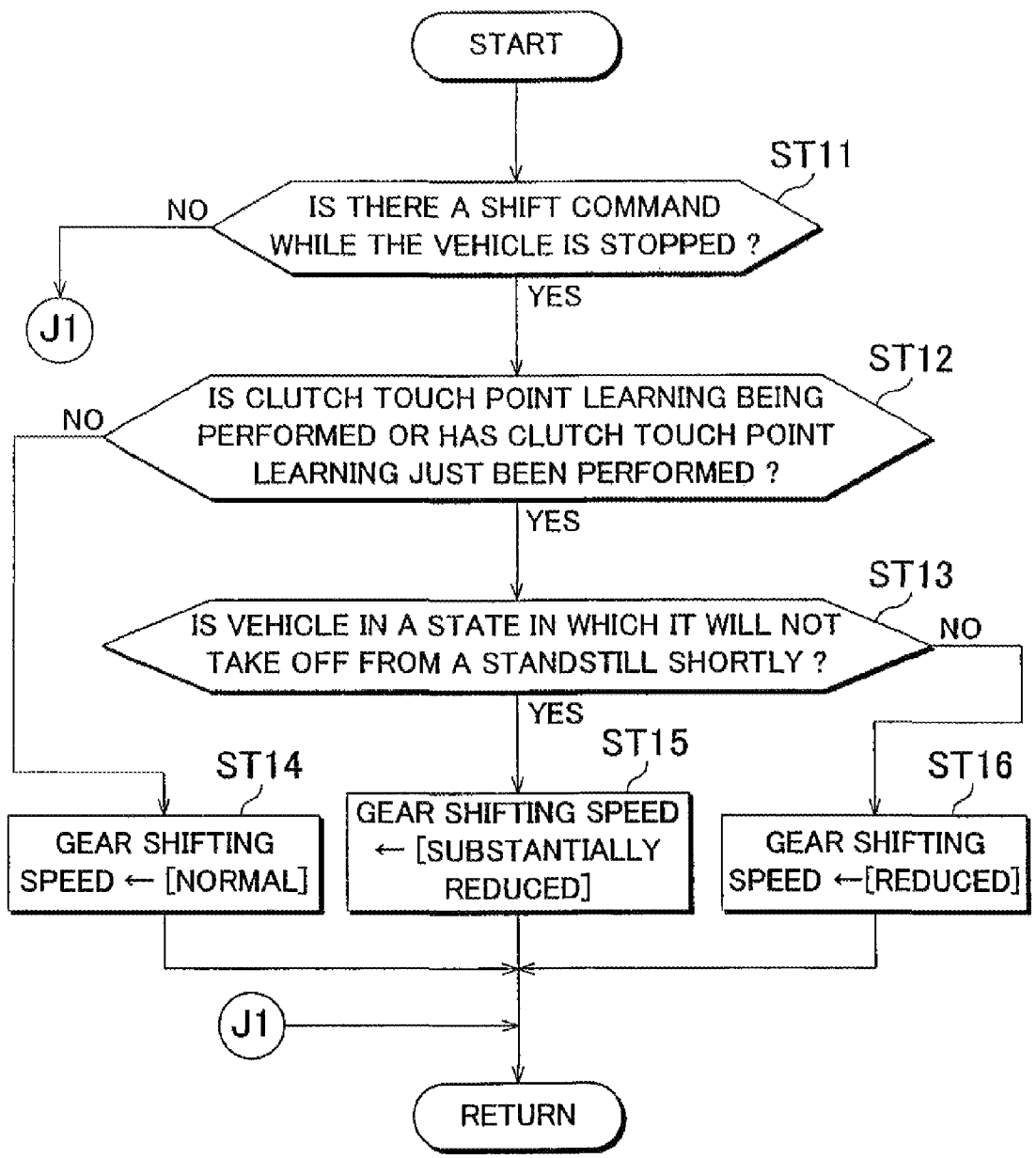
FIG. 6 is a flowchart illustrating an example of gear shifting speed control.

A specific example of this control will now be described with reference to the flowchart shown in FIG. 6. The gear shifting speed control routine in FIG. 6 is repeatedly executed in the ECU 100 at predetermined intervals of time (such as every several ms).

First in step ST11, the ECU 100 determines whether there is a command to shift into first speed (1st) or reverse (Rev) when the vehicle is stopped (i.e., idling). More specifically, when the driver shifts the shift lever 9a of the shift device 9 and a signal indicating that shift lever 9a has been shifted into the shift position for first speed (1st) or reverse (Rev) has been output from the shift position sensor 406, the ECU 100 determines that there is a shift command and proceeds to step ST12. If, on the other hand, the determination result of step ST11 is no (i.e., there is no shift command), this cycle of the routine ends.

In step ST12, the ECU 100 determines whether the clutch touch point is being, or has just been, learned. If the determination result is no, the ECU 100 executes a gear shift at the normal gear shifting speed in step ST14 and this cycle of the routine ends.

Incidentally, the term gear shifting speed refers to the speed in the shifting direction shown in FIG. 3, for example. For example, when a shift operation into first speed (1st) is performed, the gear shifting speed is the speed with which the shift lever 9a is moved from position A0 to position A1 in FIG. 3.

If the determination result of step ST12 is yes, i.e., if there is a shift command while the clutch touch point is being learned or immediately thereafter, the ECU 100 determines in step ST13 whether the driver intends to take off from a standstill shortly.

More specifically, the ECU 100 determines whether the accelerator is off or the brake is on based on the output signals from the accelerator depression sensor 405 and the brake pedal sensor 407. When at least one of those determinations is yes, i.e., when the accelerator is off and/or the brake is on, the ECU 100 determines that the driver does not intend to take off from a standstill shortly and proceeds to step ST15. In step ST15, the ECU 100 substantially reduces the gear shifting speed from the normal gear shifting speed and executes the gear shift operation.

Substantially reducing the gear shifting speed during or immediately after clutch touch point learning in this way suppresses initial torque, and thus shift shock, even if a gear shift is performed when the input rotating body of the output side of the automatic clutch 2 (i.e., the input side of the transmission 3) is rotating during or immediately after clutch touch point learning.

Incidentally, the gear shifting speed that is set (in step ST15) in the gear shift control during or immediately after clutch touch point learning (i.e., the substantially reduced gear shifting speed) is a gear shifting speed that is empirically-obtained through testing and calculations or the like which enables inertia torque to be suppressed during a shift operation, taking into account the inertia mass and rotation speed of the input body during or immediately after clutch touch point learning.

If, on the other hand, the determination result of step ST13 is no, i.e., if either the accelerator is on or the brake is off such that it is determined that the driver intends to take off from a standstill shortly, then in step ST16 the gear shifting speed is reduced from what it is normally and then the gear shift operation is performed, after which this cycle of the routine ends.

Here, when step ST16 is executed, the driver will take off from a standstill shortly so a suitable gear shifting speed (i.e., a reduced speed) that was empirically-obtained through testing and calculations or the like is set taking into account the balance between the response of the gear shift operation and the suppression of inertia torque and the like.

In the gear shifting speed control described above, when there is a shift command for the transmission 3 during clutch touch point learning, clutch touch point learning is cancelled and a gear shift operation in which a shift operation value (such as the gear shifting speed) has been reduced is performed.

As described above, according to the control apparatus for a transmission in this example embodiment, when there is a shift command during or immediately after clutch touch point learning, the gear shifting speed of the transmission 3 is reduced. As a result, even if a gear shift operation is performed during or immediately after clutch touch point learning, the change in the rotation speed of the input rotating body at the time of that gear shift operation is gradual. Accordingly, inertia torque is able to be inhibited, thereby suppressing shift shock.

Other Example Embodiments

In the foregoing example embodiment, the clutch actuator 203 of the clutch operating apparatus 200 and the select actuator 301 and the shift actuator 302 of the shift operation executing apparatus 300 are each hydraulic actuators. However, the invention is not limited to this. For example, these actuators may also be electric actuators, each of which is made up of an electric motor and the like.

In the foregoing example embodiment, when there is a shift command for the transmission during or immediately after clutch touch point learning, inertia torque is suppressed by reducing the gear shifting speed. However, the method used to reduce the shift operation value is not limited to this.

For example, a load (i.e., force) applied in the shifting direction (e.g., in the direction of A0→A1 in FIG. 3) during a gear shift may be reduced from what it is normally. Also, when the shift actuator that performs the operation in the shifting direction (i.e., the shift operation) is a hydraulic actuator, the hydraulic pressure supplied to the shift actuator may be reduced from what it is normally. Further, a plurality of methods to reduce the shift operation value (i.e., gear shifting speed reduction, load (force) reduction, and hydraulic pressure reduction) may also be used in combination.

In the foregoing example embodiment, when the shift lever 9a is in the drive (D) position in which the gear speed of the transmission 3 is automatically selected according to the running state (such as the vehicle speed and accelerator depression amount) of the vehicle instead of being selected according to an operation of the shift lever 9a by the driver, a process for determining that there is a shift command when the shift lever 9a is shifted from the N position to the D position may also be added to step ST11 in FIG. 6.

Figure 7:
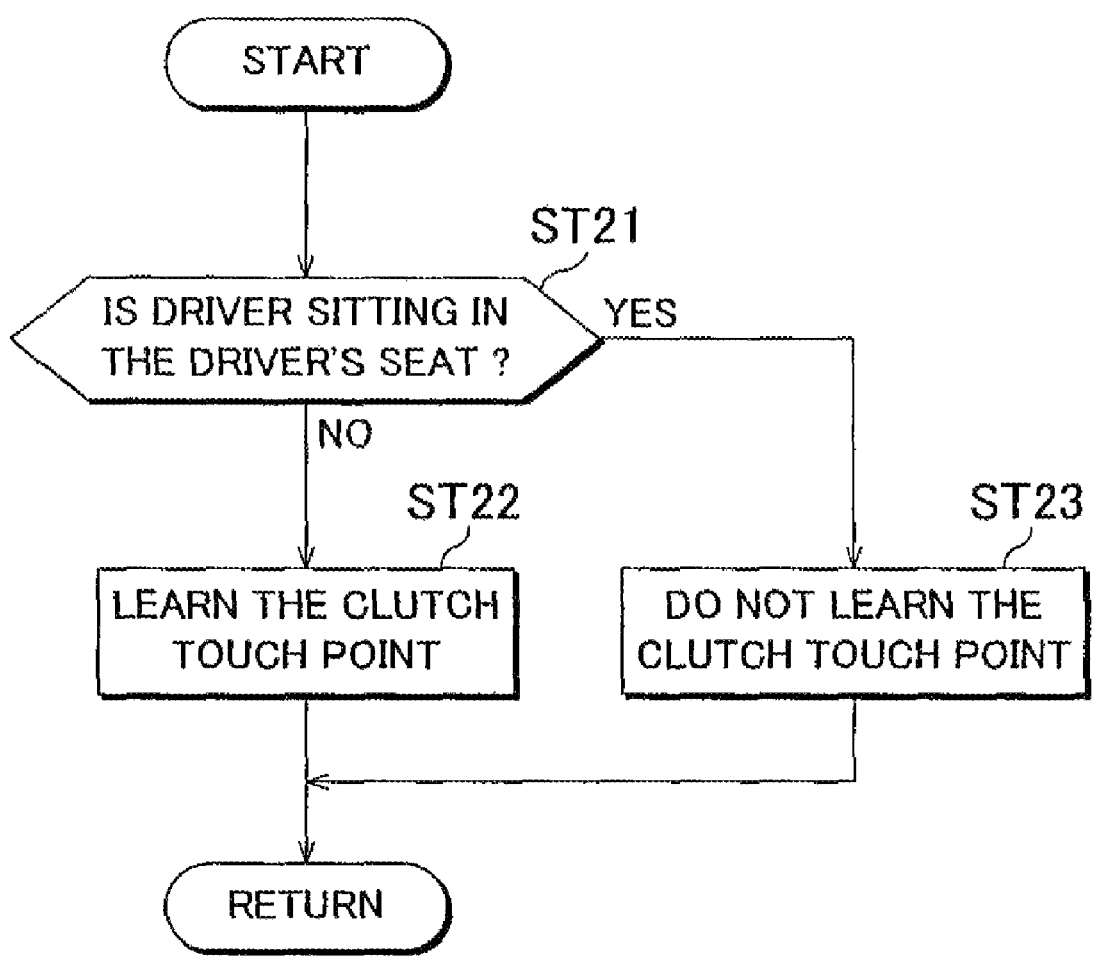
FIG. 7 is a flowchart showing an example of control for executing clutch touch point learning when a driver is not sitting in a driver's seat.

Here, the control shown in the flowchart in FIG. 7 is another example embodiment of clutch touch point learning. In this example embodiment, control is performed using a seat switch that detects when a driver is sitting in the driver's seat and driver monitor radar that detects a driver sitting in the driver's seat.

First in step ST21, the ECU 100 determines whether a driver is sitting in the driver's seat. When at least one of two conditions, one being that the seat switch be off and the other being that a driver not be detected by the driver monitor radar, is satisfied (i.e., when the determination result of step ST21 is no), clutch touch point learning is performed in step ST22.

If, on the other hand, the determination result of step ST21 is yes, i.e., if a driver is sitting in the driver's seat, clutch touch point learning is not performed (step ST23).

In this way, a gear shift during or immediately after clutch touch point learning can be avoided by not learning the clutch touch point when a driver is sitting in the driver's seat.

In the example embodiments described above, the invention is applied to control of a transmission having five forward speeds. However, the invention is not limited to this. That is, the invention may also be applied to control of a transmission (such as an automated manual transmission) having any number of gear speeds.

In the foregoing example embodiments, the invention is applied to control of a transmission of a vehicle provided with an engine (i.e., an internal combustion engine) as a driving power source. However, the invention is not limited to this. For example, the invention may also be applied to control of a transmission of a hybrid vehicle that is provided with an engine (such as an internal combustion engine) and an electric motor (such as a running motor or a motor-generator) as driving power sources.

The invention claimed is:

1. A control apparatus for a transmission that includes a shift operation executing unit that performs a shift operation in the transmission of a vehicle, a clutch operating unit that selectively engages and disengages a clutch that is arranged between a driving power source of the vehicle and the transmission, and a learning unit that learns a clutch touch point of the clutch, comprising:
   a determining unit that determines whether clutch touch point learning has just been performed by the learning unit; and
   a shift operation value reducing unit that reduces a shift operation value in the transmission when there is a shift command for the transmission, when an output side of the clutch is rotating immediately after the clutch touch point learning,
   wherein the shift operation value is at least one of i) a shifting speed, ii) a load applied at the time of the shift operation, and iii) pressure applied at the time of the shift operation.

2. The control apparatus according to claim 1, further comprising:
   an accelerator operation determining unit that determines whether an accelerator operation is being performed; and
   a brake operation determining unit that determines whether a brake operation is being performed,
   wherein the shift operation value reducing unit reduces the shift operation value more when at least one of two conditions is satisfied during or immediately after the clutch touch point learning, the two conditions being i) that an accelerator be off, and ii) that a brake be on.

3. The control apparatus according to claim 2, wherein the shift operation value reducing unit reduces the shift operation value more when at least one of two conditions is satisfied during or immediately after the clutch touch point learning, the two conditions being i) that the accelerator be off, and ii) that the brake be on, compared with when the accelerator is on and the brake is off.

4. The control apparatus according to claim 2, wherein the shift operation value reducing unit reduces the shift operation value more based on i) a rotation speed of an input rotating body that includes an input shaft and an input side gear set of the transmission, and ii) an inertia mass of the input rotating body, when at least one of two conditions is satisfied during or immediately after clutch touch point learning, the two conditions being i) that the accelerator be off, and ii) that the brake be on.

5. The control apparatus according to claim 1, further comprising:
   a shift operation detecting unit that detects the shift operation in the transmission,
   wherein the shift operation value reducing unit determines that there is the shift command when the shift operation detecting unit detects the shift operation.

6. The control apparatus according to claim 1, further comprising:
   a clutch touch point learning cancelling unit that cancels the clutch touch point learning when there is the shift command for the transmission while the learning unit is learning the clutch touch point.

7. The control apparatus according to claim 1, further comprising:
   a driver detecting unit that detects a driver sitting in a driver's seat of the vehicle; and
   a clutch touch point learning executing unit that learns the clutch touch point with the learning unit when the driver not be detected by the driver detecting unit.

8. A control method for a transmission that includes a shift operation executing unit that performs a shift operation in the transmission of a vehicle, a clutch operating unit that selectively engages and disengages a clutch that is arranged between a driving power source of the vehicle and the transmission, and a learning unit that learns a clutch touch point of the clutch, comprising:
   determining whether clutch touch point learning has just been performed by the learning unit; and
   reducing a shift operation value in the transmission when there is a shift command for the transmission immediately after the clutch touch point learning.

9. The control method according to claim 8, further comprising:
   determining whether an accelerator operation is being performed;
   determining whether a brake operation is being performed; and
   reducing the shift operation value more when at least one of two conditions is satisfied during or immediately after the clutch touch point learning, the two conditions being i) that an accelerator be off, and ii) that a brake be on.

10. The control method according to claim 9, wherein the shift operation value is reduced more when at least one of two conditions is satisfied during or immediately after the clutch touch point learning, the two conditions being i) that the accelerator be off, and ii) that the brake be on, compared with when the accelerator is on and the brake is off.

11. The control method according to claim 9, wherein the shift operation value is reduced more based on i) a rotation speed of an input rotating body that includes an input shaft and an input side gear set of the transmission, and ii) an inertia mass of the input rotating body, when at least one of two conditions is satisfied during or immediately after clutch touch point learning, the two conditions being i) that the accelerator be off, and ii) that the brake be on.

12. The control method according to claim 8, further comprising:
    detecting the shift operation in the transmission; and
    determining that there is the shift command when the shift operation is detected.

13. The control method according to claim 8, wherein the shift operation value is at least one of i) a shifting speed, ii) a load applied at the time of the shift operation, and iii) pressure applied at the time of the shift operation.

14. The control method according to claim 8, further comprising:
    cancelling the clutch touch point learning when there is a shift command for the transmission while the learning unit is learning the clutch touch point.

15. The control method according to claim 8, further comprising:
    determining whether a driver is sitting in a driver's seat of the vehicle;
    learning the clutch touch point with the learning unit when the driver not be detected.

16. A control apparatus for a transmission that includes a shift operation executing unit that performs a shift operation in the transmission of a vehicle, a clutch operating
    unit that selectively engages and disengages a clutch that is arranged between a driving power source of the vehicle and the transmission, and a learning unit that learns a clutch touch point of the clutch, comprising:
    a determining unit that determines whether clutch touch point learning is being, or has just been, performed by the learning unit;
    a shift operation value reducing unit that reduces a shift operation value in the transmission when there is a shift command for the transmission during or immediately after the clutch touch point learning;
    an accelerator operation determining unit that determines whether an accelerator operation is being performed; and
    a brake operation determining unit that determines whether a brake operation is being performed, wherein:
    the shift operation value is at least one of i) a shifting speed, ii) a load applied at the time of the shift operation, and iii) pressure applied at the time of the shift operation; and
    the shift operation value reducing unit reduces the shift operation value more when at least one of two conditions is satisfied during or immediately after the clutch touch point learning, the two conditions being i) that an accelerator be off, and ii) that a brake be on.

* * * * *